United States Patent
Dannoux

(10) Patent No.: US 10,940,420 B2
(45) Date of Patent: Mar. 9, 2021

(54) HONEYCOMB FILTER PLUGGING AND APPARATUS FOR HONEYCOMB FILTER PLUGGING

(71) Applicant: Corning Incorporated, Corning, NY (US)

(72) Inventor: Thierry Luc Alain Dannoux, Avon (FR)

(73) Assignee: Corning Incorporated, Corning, NY (US)

( * ) Notice: Subject to any disclaimer, the term of this patent is extended or adjusted under 35 U.S.C. 154(b) by 496 days.

(21) Appl. No.: 15/577,531

(22) PCT Filed: May 25, 2016

(86) PCT No.: PCT/US2016/033982
§ 371 (c)(1),
(2) Date: Nov. 28, 2017

(87) PCT Pub. No.: WO2016/196094
PCT Pub. Date: Dec. 8, 2016

(65) Prior Publication Data
US 2018/0147521 A1    May 31, 2018

Related U.S. Application Data

(60) Provisional application No. 62/168,215, filed on May 29, 2015.

(51) Int. Cl.
*C04B 38/00* (2006.01)
*B28B 3/26* (2006.01)
(Continued)

(52) U.S. Cl.
CPC ..... *B01D 46/2459* (2013.01); *B01D 39/2075* (2013.01); *B01D 46/0001* (2013.01);
(Continued)

(58) Field of Classification Search
CPC .................................................. B28B 3/2627
See application file for complete search history.

(56) References Cited

U.S. PATENT DOCUMENTS

| 3,885,977 A | 5/1975 | Lachman et al. |
| 4,413,395 A | 11/1983 | Garnier |

(Continued)

FOREIGN PATENT DOCUMENTS

| CH | 86809 A | * | 10/1920 | ........... B28B 3/2627 |
| DE | 456671 C | * | 2/1928 | ........... B28B 3/2627 |

(Continued)

OTHER PUBLICATIONS

International Search Report and Written Opinion of the International Searching Authority; PCT/US2016/033982; dated Oct. 17, 2016; 12 Pages; Korean Intellectual Property Office.
(Continued)

*Primary Examiner* — Erin Snelting
(74) *Attorney, Agent, or Firm* — Kurt R. Denniston

(57) ABSTRACT

A method for forming a plugged honeycomb article includes feeding a ceramic precursor material through an extrusion die, the extrusion die having a plurality of pins, a plurality of cavities bounded by adjacent pins, and alternating end-faces of the plurality of pins include extensions extending from an outlet of the extrusion die in an extrusion direction. The method further includes extruding the ceramic precursor material through the extrusion die to form a web structure comprising a plurality of cell walls and channels bounded by adjacent cell walls, supporting the web structure that has been extruded through the extrusion die, and providing movement between the extrusion die and the web structure in at least one direction substantially orthogonal to the extrusion direction while the extensions are positioned in at least a portion of the channels.

19 Claims, 9 Drawing Sheets

(51) Int. Cl.
  *B28B 11/00* (2006.01)
  *B28B 3/20* (2006.01)
  *B01D 46/24* (2006.01)
  *C04B 35/185* (2006.01)
  *C04B 35/478* (2006.01)
  *C04B 35/565* (2006.01)
  *C04B 35/195* (2006.01)
  *B01D 39/20* (2006.01)
  *B01D 46/00* (2006.01)

(52) U.S. Cl.
  CPC ......... *B01D 46/244* (2013.01); *B01D 46/247* (2013.01); *B28B 3/269* (2013.01); *B28B 3/2627* (2013.01); *B28B 11/006* (2013.01); *C04B 35/185* (2013.01); *C04B 35/195* (2013.01); *C04B 35/478* (2013.01); *C04B 35/565* (2013.01); *C04B 38/00* (2013.01); *C04B 38/0012* (2013.01); *B01D 2046/2481* (2013.01); *B28B 2003/203* (2013.01)

(56) References Cited

U.S. PATENT DOCUMENTS

| | | | |
|---|---|---|---|
| 4,483,944 A | 11/1984 | Day et al. | |
| 4,855,265 A | 8/1989 | Day et al. | |
| 5,183,608 A | 2/1993 | Guile | |
| 5,258,150 A | 11/1993 | Merkel et al. | |
| 5,290,739 A | 3/1994 | Hickman | |
| 5,525,291 A * | 6/1996 | St. Julien | B29C 48/11 |
| | | | 419/41 |
| 6,210,626 B1 | 4/2001 | Cornelius et al. | |
| 6,319,870 B1 | 11/2001 | Beall et al. | |
| 6,368,992 B1 | 4/2002 | Beall et al. | |
| 6,432,856 B1 | 8/2002 | Beall et al. | |
| 6,620,751 B1 | 9/2003 | Ogunwumi | |
| 6,673,414 B2 | 1/2004 | Ketcham et al. | |
| 6,773,657 B2 | 8/2004 | Beall et al. | |
| 6,849,181 B2 | 2/2005 | Ogunwumi et al. | |
| 6,864,198 B2 | 3/2005 | Merkel | |
| 6,942,713 B2 | 9/2005 | Ogunwumi et al. | |
| RE388,888 | 11/2005 | Beall et al. | |
| 6,972,045 B2 | 12/2005 | Itoh | |
| 7,070,728 B2 | 7/2006 | Dannoux et al. | |
| 7,141,089 B2 | 11/2006 | Beall et al. | |
| 7,169,341 B2 * | 1/2007 | Bruck | B01J 35/04 |
| | | | 264/150 |
| 7,300,487 B2 | 11/2007 | Fujita | |
| 8,673,206 B2 * | 3/2014 | Avery | B29C 48/40 |
| | | | 264/630 |
| 2004/0018123 A1 | 1/2004 | Okawara et al. | |
| 2004/0020846 A1 | 2/2004 | Ogunwumi et al. | |
| 2004/0029707 A1 | 2/2004 | Beall et al. | |
| 2004/0092381 A1 | 5/2004 | Beall et al. | |
| 2004/0206062 A1 | 10/2004 | Ichikawa | |
| 2004/0261384 A1 | 12/2004 | Merkel et al. | |
| 2005/0046063 A1 | 3/2005 | Toda et al. | |
| 2005/0101118 A1 | 5/2005 | Kimura et al. | |
| 2006/0197252 A1 | 9/2006 | Ishikawa et al. | |
| 2006/0280905 A1 | 12/2006 | Ichikawa | |
| 2007/0039298 A1 | 2/2007 | Tokumaru | |
| 2009/0243139 A1 | 10/2009 | Tsuji et al. | |

FOREIGN PATENT DOCUMENTS

| | | | | |
|---|---|---|---|---|
| DE | 554359 | C * | 7/1932 | ........... B28B 3/2627 |
| DE | 562484 | C * | 10/1932 | ........... B28B 3/2627 |
| DE | 586788 | C * | 10/1933 | ........... B28B 3/2627 |
| EP | 1403477 | A2 | 3/2004 | |
| FR | 415660 | A * | 10/1910 | ........... B28B 3/2627 |
| FR | 490218 | A * | 4/1919 | ........... B28B 3/2627 |
| FR | 503948 | A * | 6/1920 | ........... B28B 3/2627 |
| GB | 191009776 | A * | 11/1910 | ........... B28B 3/2627 |
| GB | 191122359 | A * | 6/1912 | ........... B28B 3/2627 |
| GB | 191126403 | A * | 8/1912 | ........... B28B 3/2627 |
| GB | 166403 | A * | 7/1921 | ........... B28B 3/2627 |
| WO | 2006015240 | A2 | 2/2006 | |

OTHER PUBLICATIONS

Japanese Patent Application No. 2017561827; Machine Translation of the Office Action dated Jan. 15, 2020; Japan Patent Office; 4 Pgs.
Machine Translation of JP2017561827 Dated Apr. 3, 2019; 3 Pages; Japanese Patent Office.
EP16804013.7 Supplementary Search Report dated Nov. 28, 2018, European Patent Office, 6 Pgs.
English Translation of CN201680031154.4 Office Action dated Mar. 21, 2019; 10 Pages; Chinese Patent Office.

* cited by examiner

HONEYCOMB FILTER PLUGGING AND APPARATUS FOR HONEYCOMB FILTER PLUGGING

This application is a national stage application under 35 U.S.C. § 371 of International Patent Application Serial No. PCT/US2016/033982 filed on May 25, 2016, which claims the benefit of U.S. Provisional Application Ser. No. 62/168, 215, filed on May 29, 2015, the contents of both are relied upon and incorporated herein by reference in their entireties.

BACKGROUND

The present specification generally relates to honeycomb filters and, more specifically, to native plugging end faces for honeycomb filters and an apparatus for native plugging end faces of honeycomb filters.

Conventionally, plugging an end face of a honeycomb filter comprises placing a mask having a checkerboard pattern on the end face of a honeycomb filter and injecting plugging material to channels of the honeycomb filter that are not covered by the mask. The honeycomb filter and the plugging material are then fired and sintered. In this conventional process, alignment of the mask must be precise so that the plugging material is accurately placed into the channels of the honeycomb filter, which can be difficult due to deformations in the honeycomb filter during extrusion, drying, and sintering. Thus, the conventional plugging of a honeycomb filter can be costly and time consuming.

SUMMARY

According to one embodiment, a method for forming a plugged honeycomb article comprises feeding a ceramic precursor material through an extrusion die, the extrusion die comprising a plurality of pins, a plurality of cavities bounded by adjacent pins, and alternating end-faces of the plurality of pins comprise extensions extending from an outlet of the extrusion die in an extrusion direction, wherein the ceramic precursor material is extruded through the cavities. The method further comprises extruding the ceramic precursor material through the extrusion die to form a web structure comprising a plurality of cell walls and channels bounded by adjacent cell walls, supporting the web structure that has been extruded through the extrusion die, and providing movement between the extrusion die and the web structure in at least one direction substantially orthogonal to the extrusion direction while the extensions are positioned in at least a portion of the channels. The movement in the substantially orthogonal direction laterally deforms the cell walls so that alternating channels are plugged.

In another embodiment, an apparatus for forming a plugged honeycomb article comprises an extrusion die, the extrusion die comprising a plurality of pins and a plurality of cavities between the plurality of pins, and alternating pins of the plurality of pins comprise extensions extending from an outlet of the extrusion die in an extrusion direction. The apparatus further comprises a supporting structure that supports an extrusion of ceramic precursor material exiting an outlet of the extrusion die, and at least one of the extrusion die and the supporting structure are mechanically coupled to an eccentric system providing movement between the extrusion die and the web structure in at least one direction substantially orthogonal to the extrusion direction of the extrusion die.

In yet another embodiment, a honeycomb filter is disclosed. The honeycomb filter comprising: a first end face; a second end face; and a plurality of porous walls extending from the first end face to the second end face. The porous cell walls forming channels and a grid pattern at the first end face and the second end face. Alternating channels are plugged at the first end face, and the alternating channels that are plugged at the first end face are plugged by a composition identical to a composition of the porous walls.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
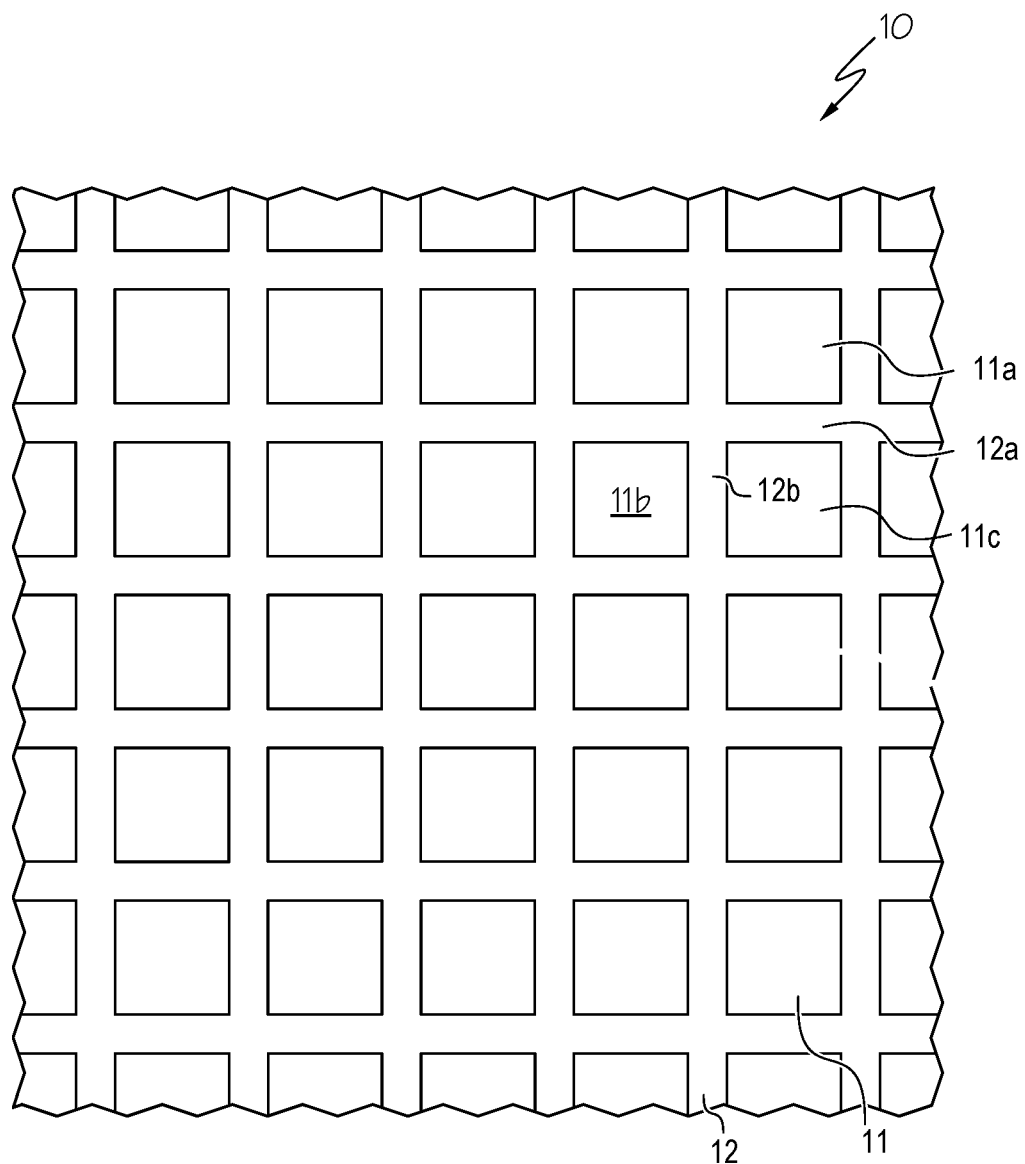
FIG. 1 schematically illustrates a front view of a portion of an extrusion die according to embodiments described herein.

Reference will now be made in detail to embodiments of native plugging a honeycomb filter, embodiments of which are illustrated in the accompanying drawings. Whenever possible, the same reference numerals will be used throughout the drawings to refer to the same or like parts. In one embodiment a method for forming a plugged honeycomb article comprises feeding a ceramic precursor material through an extrusion die, the extrusion die comprising a plurality of pins, a plurality of cavities bounded by adjacent pins, and alternating end-faces of the plurality of pins comprise extensions extending from an outlet of the extrusion die in an extrusion direction, wherein the ceramic precursor material is extruded through the cavities. The method further comprises extruding the ceramic precursor material through the extrusion die to form a web structure comprising a plurality of cell walls and channels bounded by adjacent cell walls, supporting the web structure that has been extruded through the extrusion die, and providing movement between the extrusion die and the web structure in at least one direction substantially orthogonal to the extrusion direction while the extensions are positioned in at least a portion of the channels. The movement in the substantially orthogonal direction laterally deforms the cell walls so that alternating channels are plugged.

FIG. 1 is a schematic illustration of a portion of an end face of a honeycomb extrusion die 10 according to embodiments disclosed herein. The extrusion die 10 comprises a plurality of pins 11 and a plurality of cavities 12 bounded by adjacent pins 11. By way of example, cavity 12a is bounded by adjacent pins 11a and 11c and cavity 12b is bounded by adjacent pins 11b and 11c. A ceramic precursor material is fed through the cavities 12 formed between the pins 11 to form a honeycomb structure.

Figure 2:
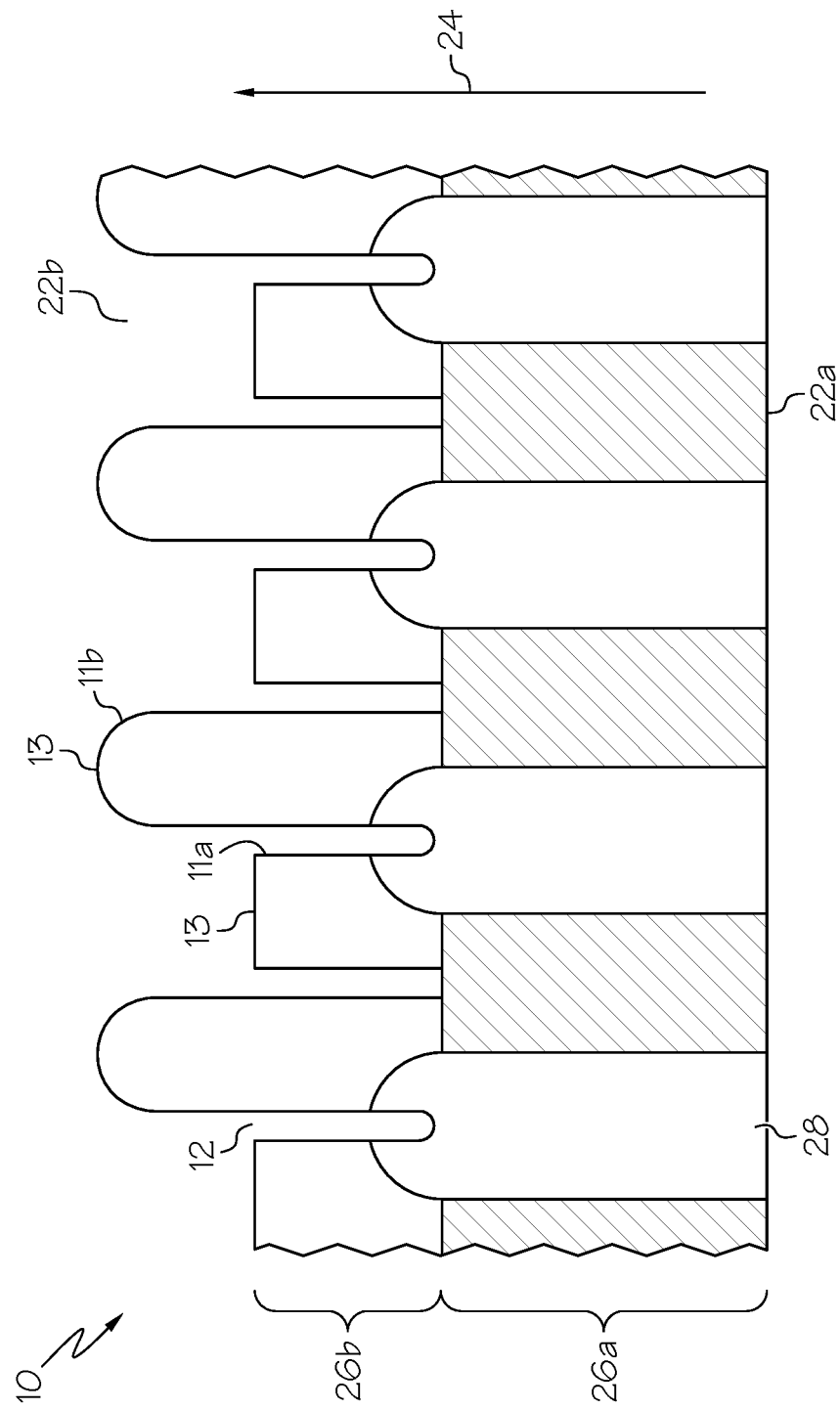
FIG. 2 schematically illustrates a cross section of a portion of an extrusion die according to embodiments described herein.

With reference to FIG. 2, the extrusion die 10 includes an inlet end 22a and a discharge end 22b opposite the inlet end 22a in an extrusion direction 24. The extrusion die 10 includes an inlet region 26a, beginning at the inlet end 22a, that defines a plurality of feedholes 28 extending from the inlet end 22a. The plurality of feedholes 28 are configured to receive precursor material from an extrusion device (not shown) such as a ram extruder, a screw extruder, or the like.

The extrusion die 10 further includes a discharge region 26b terminating at the discharge end 22b. The discharge region 26b includes the plurality of pins 11. Each pin 11 includes an end face 13 positioned along a discharge end 22b of the extrusion die 10. The plurality of pins 11 include a first set of pins 11a and a second set of pins 11b. The first set of pins 11a have a planar end face 13 and the second set of pins 11b have extensions extending from the outlet of the extrusion die in an extrusion direction 24. Although FIG. 2 shows a two-dimensional cross-section of the extrusion die, it should be understood that alternating pins in all dimensions have extensions, such as the extensions shown in the second set of pins 11b in FIG. 2, so that a checkerboard pattern of pins having extensions and pins not having extensions is formed in the extrusion die. To be clear, in extrusion dies of embodiments, if a pin that has extensions is considered the Cartesian origin, then adjacent pins in the x-direction and the y-direction do not have extensions. Likewise, in extrusion dies of embodiments, if a pin that does not have extensions is considered the Cartesian origin, then adjacent pins in the x-direction and the y-direction have extensions.

The length of the first set of pins 11a in the extrusion direction is not particularly limited and can be any length for extruding ceramic precursor material through the extrusion die 10. However, in embodiments, the extensions of the second set of pins 11b extend beyond the end face 13 of the first set of pins 11a. Thus, according to embodiments, alternating end faces 13 of the pins comprising extensions 11b extend beyond the end faces 13 of the pins that do not comprise extensions from greater than or equal to about 2 mm to less than or equal to about 10 mm, such as from greater than or equal to about 2.5 mm to less than about 8 mm. In other embodiments, the alternating end faces 13 of the pins comprising extensions 11b extend beyond the end faces 13 of the pins that do not comprise extensions from greater than or equal to about 3 mm to less than or equal to about 6 mm. Thus, in embodiments, ceramic precursor material is extruded through the cavities 12 between the first set pins 11a and the second set of pins 11b to the end face 13 of the first set of pins 11a. When the ceramic precursor material reaches end face 13 of the first set of pins 11a, the precursor material is only bounded by an extension of the second set of pins 11b, and is not bounded by the first set of pins 11a.

During production of the honeycomb filter, ceramic precursor materials, such as inorganic materials, a liquid vehicle and a binder, are mixed into a batch. For instance the batch can comprise various mixtures including a paste and/or slurry, such as particles and/or powders mixed with polymer binders and/or low molecular weight liquids and combinations of these and other materials, such as for forming a paste. Descriptions of example materials that may be used for the precursor material can be found in numerous patents and patent applications. Example precursor material compositions, including cordierite, are disclosed in U.S. Pat. No. 3,885,977; RE 38,888; U.S. Pat. Nos. 6,368,992; 6,319, 870; 6,210,626; 5,183,608; 5,258,150; 6,432,856; 6,773, 657; 6,864,198; and U.S. Patent Application Publication Nos. 2004/0029707, 2004/0261384, and 2005/0046063, which are incorporated herein by reference in their entirety. Examples ceramic batch material compositions for forming aluminum titanate are those disclosed in U.S. Pat. Nos. 4,483,944; 4,855,265; 5,290,739; 6,620,751; 6,942,713; 6,849,181; U.S. Patent Application Publication Nos.: 2004/0020846; 2004/0092381; and in PCT Application Publication Nos. WO 2006/015240; WO 2005/046840; and WO 2004/011386, which are incorporated herein by reference in their entirety.

In embodiments, ceramic precursor can then be extruded in the extrusion direction 24 by way of the extrusion die 10. The extrudate has a web structure that comprises a plurality of cell walls and channels bounded by adjacent cell walls. The dimensions of the channels and thicknesses of the cell walls are not particularly limited and may vary depending on the end use of the honeycomb filter. However, it should be understood that increasing the area of a frontal surface, such as the surface depicted in FIG. 1, that comprises channels will decrease the pressure drop across the honeycomb filter. For example, the larger the percentage of the frontal surface that is open to channels (referred to herein as the open frontal area) will decrease the pressure drop across the honeycomb filter. In embodiments, the channels may have an open frontal area from greater than or equal to about 35% to less than or equal to about 95%, such as from greater than or equal to about 45 to less than or equal to about 85. In other embodiments, the channels may have a frontal area from greater than or equal to about 55 to less than or equal to about 75, such as from greater than or equal to about 60 to less than or equal to about 70. To increase the open frontal area of the channels, the thickness of the cell walls should be decreased because, generally, the lower the percentage of the frontal surface that is comprised of cell walls, the higher the open frontal area. Accordingly, in embodiments, the thickness of the cell walls may be from greater than or equal to about 0.1 mm to less than or equal to about 0.5 mm, such as from greater than or equal to about 0.15 mm to less than or equal to about 0.45 mm. In other embodiments, the thickness of the cell walls may be from greater than or equal to about 0.05 mm to less than or equal to about 0.75 mm, such as from greater than or equal to about 0.07 to less than or equal to about 0.5 mm.

In embodiments, a honeycomb filter having the open frontal area and cell wall thickness provided above will have a pressure drop from greater than or equal to about 25 KPa to less than or equal to about 40 KPa, such as from greater than or equal to about 28 KPa to less than or equal to about 38 KPa. In other embodiments, a honeycomb filter having the open frontal area and cell wall thickness provided above will have a pressure drop from greater than or equal to about 30 KPa to less than or equal to about 35 KPa.

The ceramic precursor material is fed to the extrusion die by a screw extruder or by ram extruder. In embodiments, the feed rate of the ceramic precursor material through the extrusion die 10 is from greater than or equal to about 5 mm/s to less than or equal to about 255 mm/s, such as from greater than or equal to about 12.7 mm/s to less than or equal to about 255 mm/s. In other embodiments, the feed rate of the ceramic precursor material through the extrusion die 10 is from greater than or equal to about 30 mm/s to less than or equal to about 200 mm/s, such as from greater than or equal to about 80 mm/s to less than or equal to about 150 mm/s.

Figure 3A:
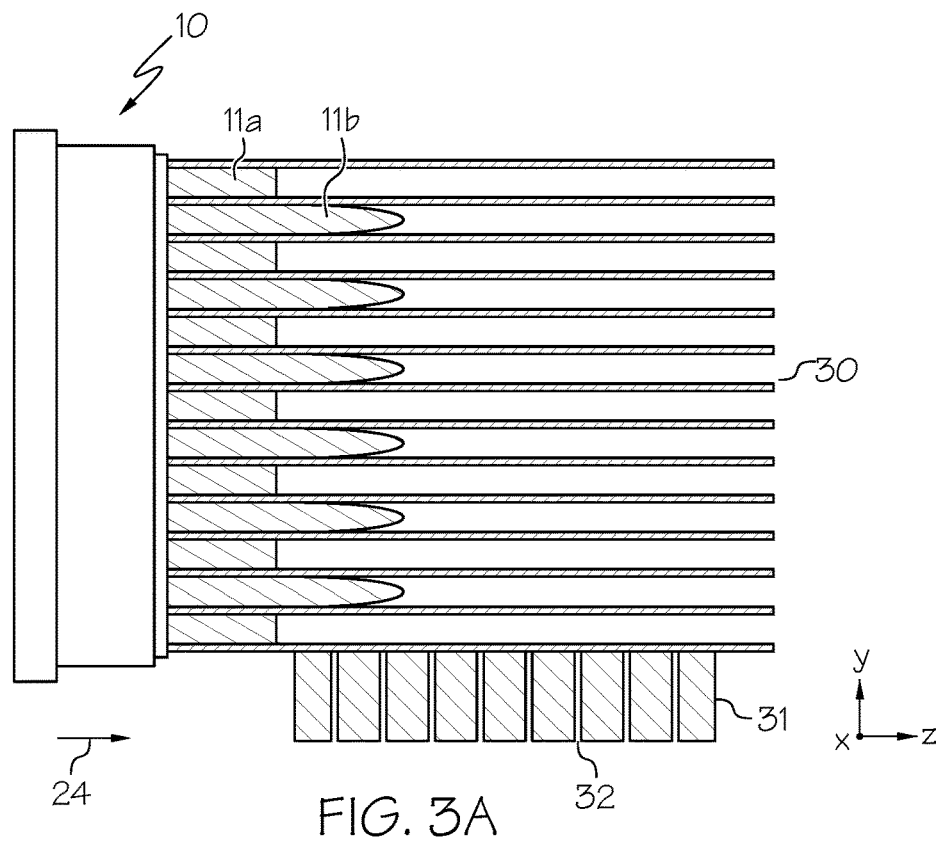
FIGS. 3A-3C schematically illustrate a side view of an extrusion die and a supporting structure according to embodiments described herein.

With reference now to FIG. 3A, which schematically depicts a side view of an extrusion die according to embodiments disclosed herein, when the honeycomb is extruded through the extrusion die 10 in an extrusion direction 24, the resulting web structure 30 is supported by a supporting structure 31. In some embodiments, the supporting structure 31 is positioned to support the web structure 30 once it clears the first set of pins 11a, which do not comprise extensions. Thus, the supporting structure 31 supports the web structure 30 while the web structure 30 is adjacent to the extensions of the second set of pins 11b. Although FIG. 3A shows the supporting structure 31 on only one side of the web structure 30, it should be understood that in embodiments the supporting structure 31 may be located on more sides of the web structure 30. For example, the support structure 31 may be located below the web structure 30 and above the web structure 30. Alternatively, the supporting structure 31 may enclose the entire web structure 30. In embodiments, the supporting structure 31 may be selected from an air bearing presenting an hemi-cylindrical or cylindrical section, series of moving belts or caterpillar or set of rollers. As shown in FIG. 3A, the supporting structure, in embodiments, comprises fluid delivery channels 32 that deliver a fluid to the surface of the supporting structure that supports the web structure so that there is no physical contact between the supporting structure 31 and the web structure 30. In embodiments, the fluid may be selected from air and nitrogen.

Figure 3B:
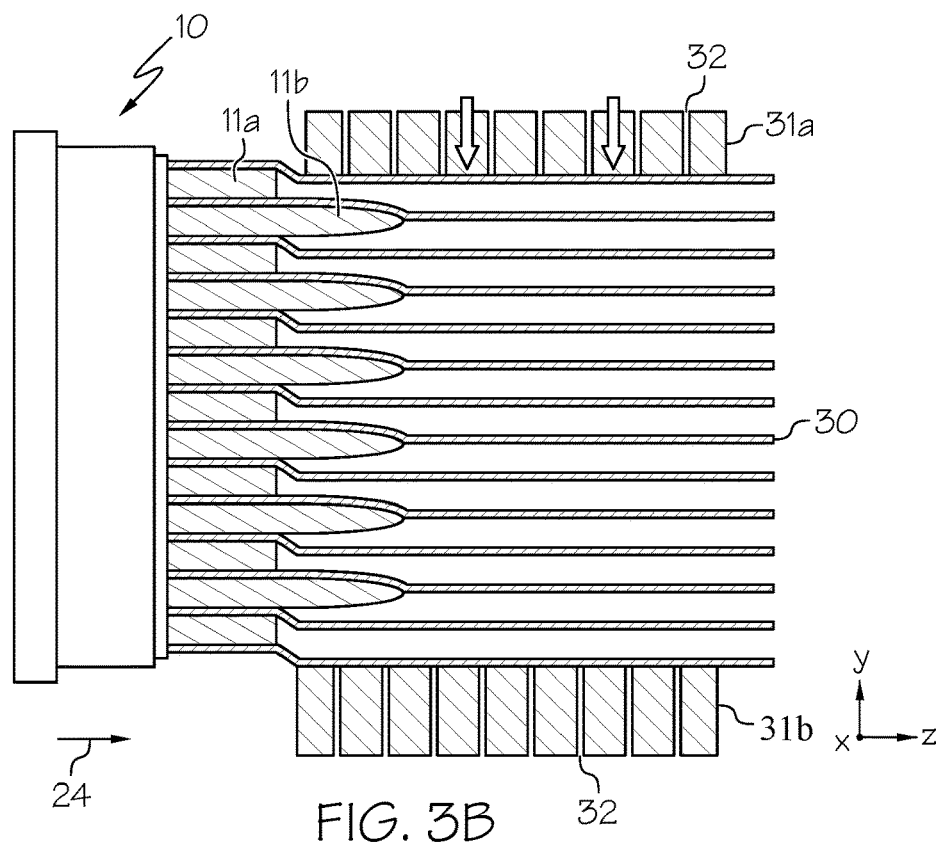
Figure 3C:
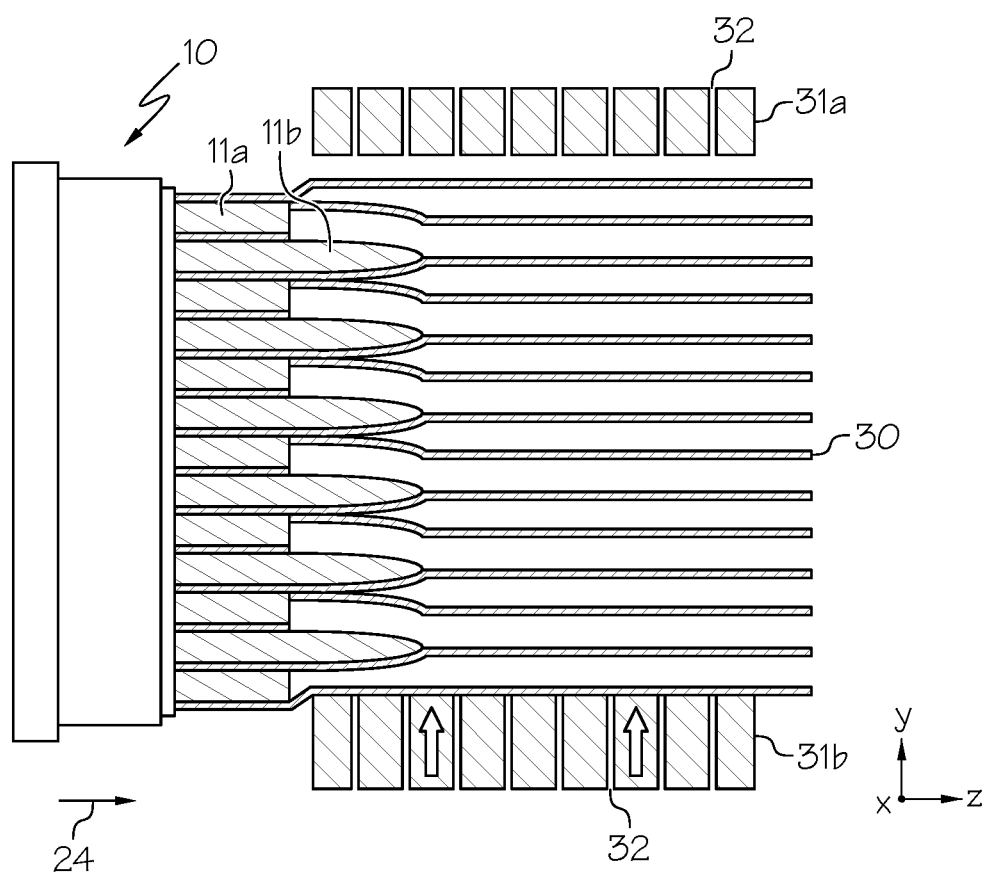

In embodiments disclosed herein the extrusion die and the supporting structure provide movement relative to one another in a direction substantially orthogonal to the extrusion direction while the extensions are positioned in at least a portion of the channels. With reference to FIG. 3B, the web structure 30 is supported by the supporting structure 31, and the supporting structure 31 provides movement in the y-direction and the x-direction (i.e., orthogonal to the extrusion direction 24). This movement causes the extensions on the second set of pins 11b to contact the web structure 30, which creates deformation of the web structure in the direction of the movement as the ceramic precursor material is extruded through the extrusion die 10. With reference to FIG. 3A, the supporting structure 31 and the pins 11 are aligned so that when the precursor material is extruded through the extrusion die 10 and is supported by the supporting structure 31 so that the web structure 30 is not deformed. In contrast, as shown in FIG. 3B, which includes a supporting structure 31a above the web structure 30 and a supporting structure 31b below the web structure 30, movement of the supporting structures 31a and 31b in the negative y-direction causes the supporting structures 31a and 31b to be misaligned with the pins 11 in the negative y-direction and creates a deformation in the web structure 30 in the positive y-direction. Similarly, as shown in FIG. 3C, the supporting structures 31a and 31b may be moved in the positive y-direction causing the supporting structures 31a and 31b to be misaligned with the pins 11 in the positive y-direction and creating deformations of the web structure 30 in the negative y-direction. Although not shown in the figures, it should be understood that the supporting structure 31 can similarly be moved in the positive x-direction and in the negative x-direction, thereby creating similar deformations in the web structure 30 as shown in FIGS. 3A and 3B, but in the negative x-direction and in the positive x-direction. Making the movement as described above causes cell walls of the web structured to converge where the deformation occurs. This convergence of the cell walls where causes lateral deformation in the channels at alternating cells where the extensions of the second set of pins 11b are positioned in at least a portion of the channel and plugs these alternating channels by lateral deformation. This plugging creates a checkerboard pattern of alternating plugged and unplugged channels in the web structure. It should be understood that although the above description is directed to movement of the supporting structure 31, the web structure 30 essentially moves in unison with the supporting structure 31. Therefore, in embodiments, movement of the supporting structure 31 is synonymous with movement of the web structure 30.

In embodiments described above, the supporting structure 31 moves relative to the extrusion die 10 (e.g., the extrusion die 10 is held stationary and the supporting structure 31 moves in a direction substantially orthogonal to the extrusion direction 24 about the extrusion die 10). However, in other embodiments, the supporting structure 31 is held stationary and the extrusion die 10 moves relative to the supporting structure 31 (e.g., the supporting structure 31 is held stationary and the extrusion die 10 moves in a direction substantially orthogonal to the extrusion direction 24 about the supporting structure 31). In other embodiments, the supporting structure 31 and the extrusion die 10 may simultaneously move in a direction substantially orthogonal to the extrusion direction 24 so long as the movement of the supporting structure 31 and the extrusion die 10 is not synchronized. By way of example, if the movement of the supporting structure 31 and the extrusion die 10 is synchronized, the pins 11 and the supporting structure 31 will be aligned. Thus, no deformation in the web structure will occur.

In embodiments, the movement between the extrusion die and the web structure may be periodic movement. For example, in some embodiments ceramic precursor material is extruded through the extrusion die 10 to form a web structure 30. When the web structure reaches a desirable length the movement between the extrusion die 10 and the web structure commences, creating the deformations described above and plugging alternating channels of the web structure in a checkerboard pattern. The movement between the extrusion die 10 and the web structure 30 continues for a period of time to provide a desired length of deformation. When the desired length of deformation is achieved, the movement between the extrusion die 10 and the web structure 30 is stopped and the pins 11 of the extrusion die 10 are aligned with the supporting structure 31 to provide a web structure without deformations. This periodic movement may be repeated a number of times to create a log of web structure that comprises lengths without deformation of the channels and regions with deformations of the channels. The parameters of the plugging will be described herein below.

Using the above-described movement to plug alternating channels of the web structure in a checkerboard pattern allows the plugging to be completed without using additional plugging material, which reduces production costs. Further, plugging the web structure using the above-described movement also allows the plugging to be conducted while the web structure is being extruded, which reduces production time compared to conventional methods that require a separate plugging once the honeycomb filter has been dried.

The above-disclosed movement between the extrusion die 10 and the web structure 30 (via movement of the supporting structure 31) may be controlled by any structure. In embodiments, the movement between the extrusion die 10 and the web structure 30 is controlled by a system of electric motors that, for example, move the extrusion die in the x-direction and the y-direction. These electric motors may be actuated by a computer that may be programmed to provide movement in nearly many differing geometrical patterns and at controlled velocities. In some embodiments, the electric motors are servo motors, electromagnetic exitator, transducers, or vibrators. In embodiments, the electric motors move the extrusion die 10 and/or the support structure 31 by a screw drive, a chain drive, gears, or combination of both, physically coupling the extrusion die 10 and/or the support structure 31 and the electric motor, whereby movement of the electric motor causes the screw drive or chain drive to move the extrusion die 10 and/or the support structure 31 in a given direction.

In addition to electric motors directly coupled to the extrusion die 10 and/or the supporting structure, the extrusion die 10 and/or the support structure 31 may be moved by a mechanical system. In embodiments, and with reference to FIG. 4, the mechanical system 40 comprises a motor 41, a first gear 42 coupled to the motor 41, and a second gear 43 meshed with the first gear 42. In embodiments, the second gear 43 is annular and houses at least two eccentric rings 44 and 45. In embodiments, the at least two eccentric rings 44 and 45 include an outer eccentric ring 44 that is coupled to the second gear 43 and an inner eccentric ring 45 that is coupled to the outer eccentric ring 44 and a holder 46 that holds the extrusion die 10 (not shown).

The motor 41 may be any electric motor that can provide multiple velocities and has sufficient power to drive the mechanical system 40. For example, in some embodiments, the motor may be a DC brushless electrical motor. The motor 41 and the first gear 42 may coupled by any mechanism. In embodiments, the first gear 42 may be directly and physically connected to the output shaft of the motor 41. In other embodiments, the output shaft of the motor 41 may be coupled to the first gear 42 by a belt, a chain, or the like.

Figure 4:
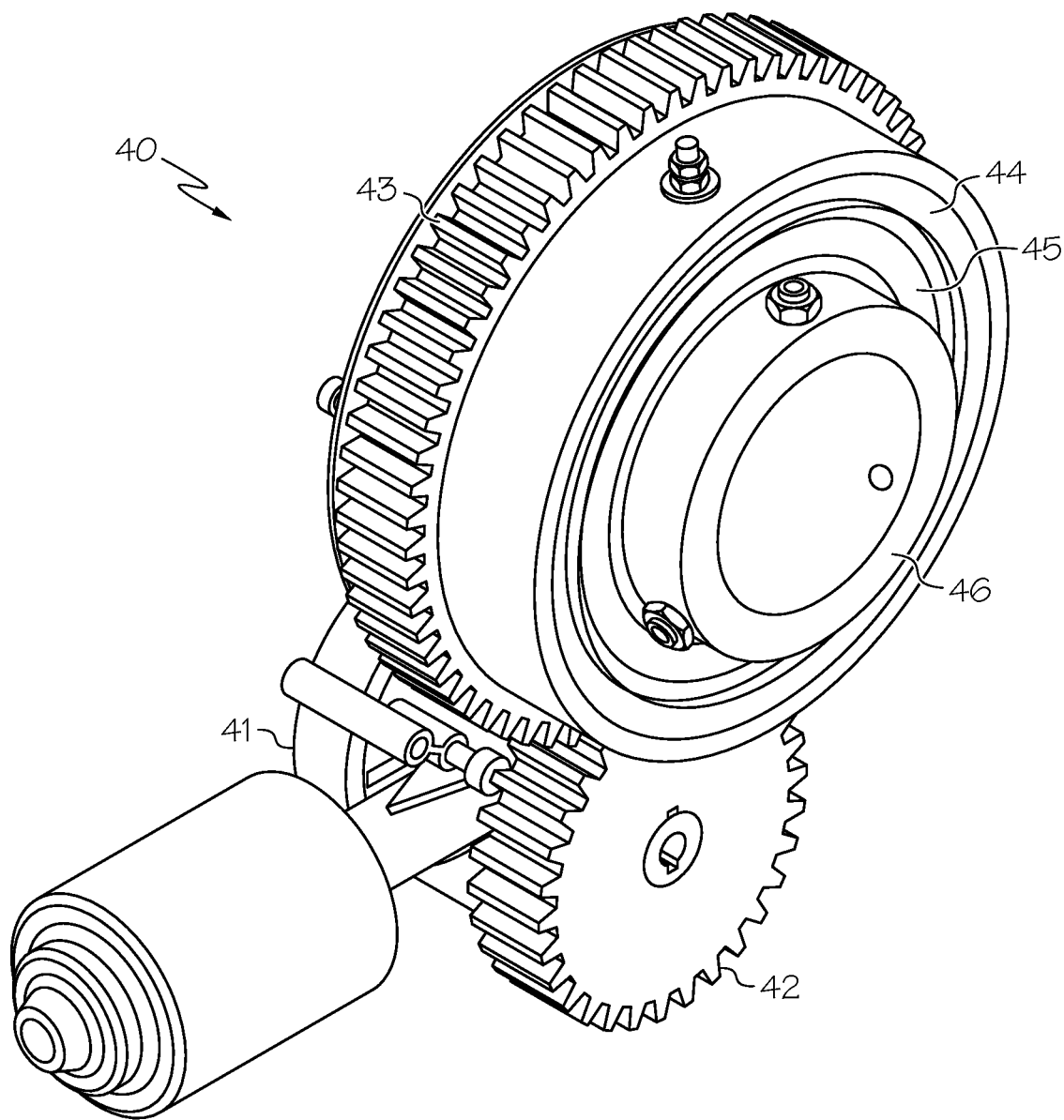
FIG. 4 schematically illustrates a mechanical system for providing movement between an extrusion die and a web structure according to embodiments described herein.

The first gear 42 and the second gear 43 may be meshed by conventional apparatuses. Although FIG. 4 depicts the first gear 42 being smaller than the second gear 43, it should be understood that the size of the first gear 42 and the second gear 43 may have any relationship and is dependent on the type of motor 41 used and the desired transfer of torque. In addition, the relative positioning of first gear 42 and the second gear 43 is not limited to the vertical stack design shown in FIG. 4. Some embodiments may not comprise a first gear 42 and the electric motor may be directly coupled to the second gear 43 that houses the outer eccentric ring 44 and the inner eccentric ring 45 by the mechanisms described above.

The second gear 43 is coupled to the outer eccentric ring 44. In embodiments, the second gear 43 is annular and is coupled to the outer eccentric ring by physically connecting the outer eccentric ring 44 and the second gear 43. In embodiments the strength of the coupling is strong so that the outer eccentric ring 44 rotates with the second gear 43. In embodiments, the second gear 43 and the outer eccentric ring 44 are coupled by mechanical fastening, such as with screws, bolts, or rivets, or the second gear 43 and the outer eccentric ring 44 may be welded together.

The interrelationship between the outer eccentric ring 44, the inner eccentric ring 45, and the holder 46 will be described with reference to FIG. 5A and FIG. 5B. The holder 46 is physically coupled to the inner eccentric ring 45. In embodiments, the physical coupling of the holder 46 and the inner eccentric ring 45 may be made by fasteners, such as screws, bolts, or rivets, or by welding the holder 46 to the inner eccentric ring 45. In some embodiments the holder 46 and the inner eccentric ring 45 are coupled by a removable fastener so that the holder 46 and the inner eccentric ring 45 can be interchanged with other holders and inner eccentric rings, depending on the geometry of the extrusion die. The holder 46 depicted in FIGS. 5A and 5B has an annular geometry, and the geometry of the holder 46 may match the geometry of the extrusion die. Accordingly, the geometry of the holder 46 is not annular in all embodiments.

It should be understood that as used herein the terms "ring" and "annular" do not strictly refer to a circle-shaped structure. Rather, as used herein, "ring" and "annular" can be used to refer to oblong, irregular shapes. In embodiments, the inner eccentric ring 45 and the outer eccentric ring 44 comprise an inconsistent difference between an inner radius and an outer radius. In other words, the thickness of the inner eccentric ring 45 and the outer eccentric ring 44 varies over the perimeter of the inner eccentric ring 45 and the outer eccentric ring 44. As shown in FIG. 5A, when the thick portion 45a of the inner eccentric ring 45 is aligned with the thin portion 44b of the outer eccentric ring 44, the holder 46 is in a concentric position with the outer perimeter of the outer eccentric ring 44. However, as shown in FIG. 5B, when the thin portion 45b of the inner eccentric ring 45 is aligned with the thin portion 44b of the outer eccentric ring 44, the holder 46 is in an eccentric position with the outer perimeter of the outer eccentric ring.

In embodiments, the inner eccentric ring 45, which is coupled to the holder 46, is movable relative the outer eccentric ring 44. Thereby, the holder 46 may be adjusted from a concentric position with the outer perimeter of the outer eccentric ring 44, as shown in FIG. 5A, to a maximum eccentric position with the outer perimeter of the outer eccentric ring 44 as shown in FIG. 5B. Between the concentric position shown in FIG. 5A and the maximum eccentric position shown in FIG. 5B, there are numerous intermediate eccentric positions to which the holder 46 may be adjusted. This adjustment may be made by moving the inner eccentric ring 45 relative to the outer eccentric ring 44 so that the point of maximum thickness of the inner eccentric ring 45 does not align with the points of maximum or minimum thickness of the outer eccentric ring 44. In embodiments, the variation in thicknesses of the inner eccentric ring 45 and the variation of thickness of the outer eccentric ring 44 allow the holder 46 to be concentric with the outer perimeter of the outer eccentric ring to a position where the holder has a maximum eccentricity to the outer perimeter of the outer eccentric ring of 5 mm, such as from concentric with the outer perimeter of the outer eccentric ring to a position where the holder has a maximum eccentricity to the outer perimeter of the outer eccentric ring of 4 mm. It should be understood that the eccentricity of the holder to the outer perimeter of the outer eccentric ring 44 may be adjusted to be at any eccentricity between zero (concentric) to the maximum eccentricity.

Figure 5A:
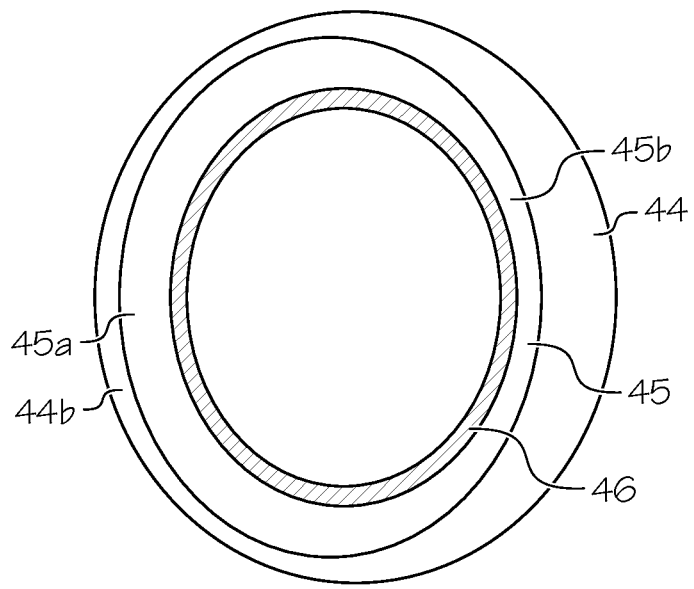
FIGS. 5A and 5B schematically illustrate and outer eccentric ring, an inner eccentric ring, and a holder of the mechanical system illustrated in FIG. 4 according to embodiments described herein.
Figure 5B:
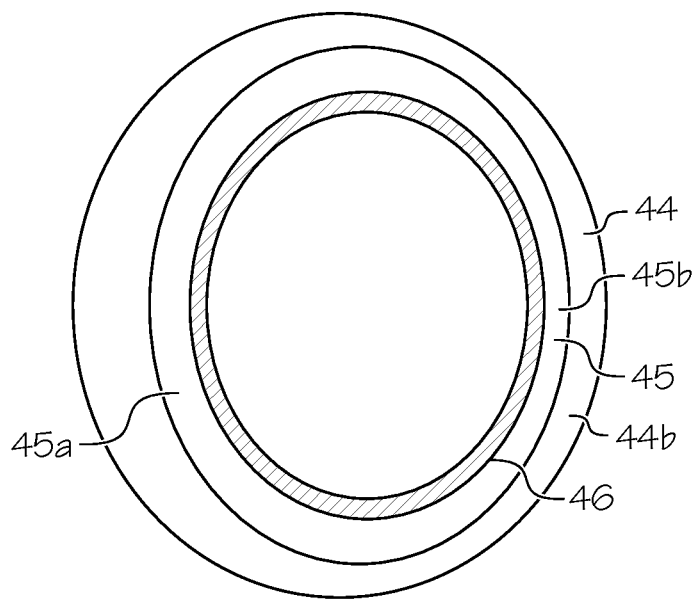

In embodiments not shown in FIG. 5A and FIG. 5B spacers may be inserted between one or more of the outer eccentric ring 44 and the inner eccentric ring 45, and between the inner eccentric ring 45 and the holder 46. The spacers may be movable such that they fill any gaps that are formed when the inner eccentric ring 45 is moved relative to the outer eccentric ring 44. In other embodiment, a holding structure may be used to maintain the relative position of the inner eccentric ring 45 and the outer eccentric ring 44. For example, a nut and bolt may be used to fasten the inner eccentric ring 45 to the outer eccentric ring 44 when the inner eccentric ring 45 is placed in position relative to the outer eccentric ring 44.

When the holder 46 is in an eccentric position relative to the outer perimeter of the outer eccentric ring 44, and the mechanical system 40 is actuated, the holder 46 will rotate with second gear 43 providing an offset circular motion of the holder 46 relative the web structure. This offset circular motion is caused by the eccentric position of the holder 46. In embodiments, the offset circular motion may move at a speed from greater than 30 rpm to less than or equal to about 1000 rpm, such as from greater than or equal to about 50 rpm to less than or equal to about 800 rpm. In other embodiments, the offset circular motion may move at a speed from greater than or equal to about 100 rpm to less than or equal to about 600 rpm, such as from greater than or equal to about 200 rpm to less than or equal to about 400 rpm. This offset circular motion of the holder 46 will cause the deformations of the channels described above by moving the extensions present in at least a portion of the channels substantially orthogonal to the extrusion direction.

Although the mechanical system 40 depicted in FIG. 4, FIG. 5A, and FIG. 5B shows a system where the extrusion die moves relative to the web structure, it should be understood that the supporting structure may be placed in the holder 46. Thereby, in embodiments, the web structure may be moved by the mechanical system 40 in the same manner that the extrusion die is moved by the mechanical system 40.

In embodiments, the extruded web structure may be made into honeycomb filters. Ceramic precursor material is extruded through the extrusion die, such as described hereinabove. Periodic movement of the extrusion die and/or the supporting structure creates deformations in the channels of the web structure, which plug alternating channels of the web structure creating a checkerboard pattern of plugged and unplugged channels. The duration of the periodic movement will vary depending on the feed rate of the ceramic precursor material through the extrusion die. However, in embodiments, the duration of the periodic movement is sufficient to provide a plugging region that can be cut to form honeycomb filters.

Figure 6:
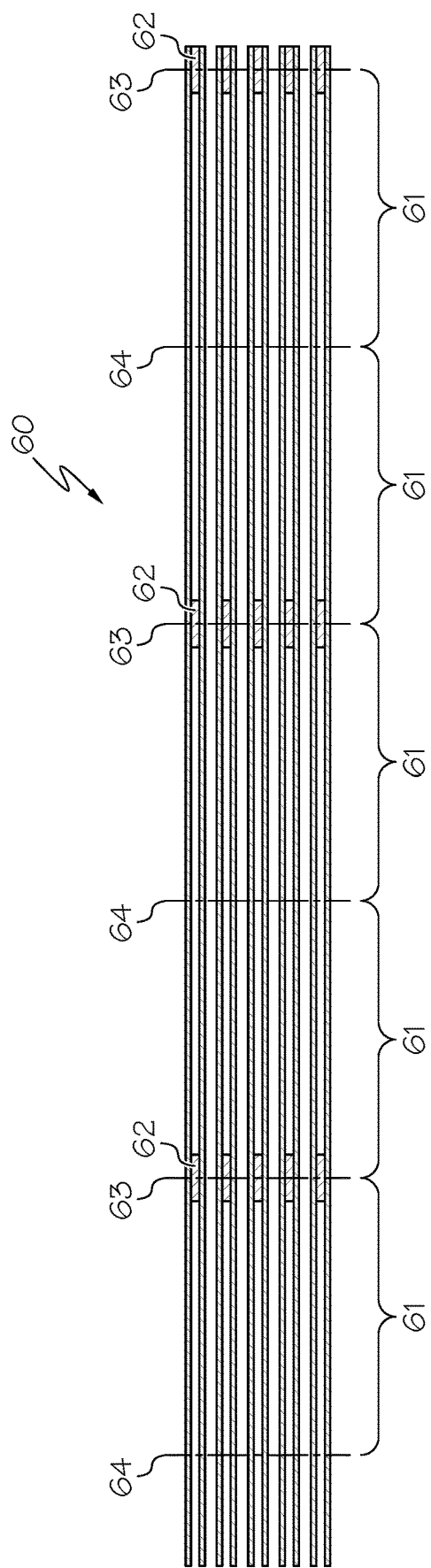
FIG. 6 schematically illustrates a web structure log comprising plugged regions according to embodiments described herein.

With reference to FIG. 6, a log 60 of web structure is depicted. In embodiments, the log 60 may have a length from greater than or equal to about 1 m to less than or equal to about 1.5 m, such as from greater than or equal to about 1.1 m to less than or equal to about 1.4 m. In other embodiments, the log may have a length from greater than or equal to about 1.2 m to less than or equal to about 1.3 m. In embodiments, the log may be divided into filter parts 61 that have a length from greater than or equal to about 125 mm to less than or equal to about 175 mm, such as from greater than or equal to about 130 mm to less than or equal to about 170 mm. In other embodiments, the log may be divided into filter parts 61 that have a length from greater than or equal to about 135 mm to less than or equal to about 165 mm, such as from greater than or equal to about 140 mm to less than or equal to about 160 mm. In still other embodiments, the filter parts 61 may have a length of about 150 mm.

Plugged regions 62 formed by deforming the channels of the web structure, such as by the methods described hereinabove, are positioned at various regions of the log 60. The plugged regions 62 are formed by the periodic movement between the extrusion die and the web structure. In embodiments, the duration of the periodic movement is such that the lengths of the plugged regions 62 are from greater than or equal to about 2 mm to less than or equal to about 30 mm, such as from greater than or equal to about 4 mm to less than or equal to about 20 mm. In other embodiments, the duration of the periodic movement is such that the lengths of the plugged regions 62 are from greater than or equal to about 6 mm to less than or equal to about 18 mm, such as from greater than or equal to about 8 mm to less than or equal to about 16 mm. In some embodiments, the length of the plugged regions are from greater than or equal to about 2 times the diameter of a cell to less than or equal to about 6 times the diameter of a cell, such as from greater than or equal to about 3 times the diameter of a cell to less than or equal to about 5 times the diameter of a cell.

In embodiments, the plugged regions 62 may have a length from greater than or equal to about 2 mm to less than or equal to about 30 mm, such as from greater than or equal to about 5 mm to less than or equal to about 25 mm. In other embodiments, the plugged regions 62 may have a length from greater than or equal to about 10 mm to less than or equal to about 25 mm, such as from greater than or equal to about 15 mm to less than or equal to about 20 mm.

Once the web structure is formed into a log 60 having plugged regions 62, the log is cut at an axial location where the channels have been plugged 63 (i.e., in a plugged region) and at an axial location where the channels have not been plugged 64. The cut at the axial location where the channel has been plugged 63 may, in embodiments, be in the middle of the plugged region 62. By way of example, if a plugged region 62 has a length of 30 mm, the axial location where the channels have been plugged will be cut at about 15 mm into the plugged region 62. In embodiments, the cut at an axial location where the channels have not been plugged 64 may be at a position coinciding with the length of the filter part 61. This location is measured from the middle of the plugged region 62. By way of example, if a filter part is to be 150 mm long, the cut will be made 150 mm from the middle of the plugged region 62. By making such a cut, a honeycomb filter having a plugged end face and an unplugged end face will be formed. Producing honeycomb filters by this method allows several plugged regions 62 to be formed in a single web structure log 60 thereby reducing cost and time that would be required by conventional methods to separately plug the end face of a honeycomb filter. In embodiments, the web structure log is cut when it is still wet, thus a lubricated ribbon may be used to cut the web structure log.

In embodiments, the honeycomb filters cut from the web structure log 60 may be dried and sintered, and used as partially plugged honeycomb filters. However, in some embodiments it is desirable to plug the end face of the honeycomb filter that was not plugged by deformation of the channels during extrusion. With reference to FIG. 7A, in embodiments, to plug an end face 71 of a honeycomb filter 70 that was not plugged during extrusion, the end face 71 may be dipped into bath of plugging material 72. In embodiments, air will be displaced from the channels that were not plugged during extrusion 73 and the plugging material 72 will be drawn into the channels 73. Conversely, air will not be displaced from channels that were plugged during extrusion 74 when the end face 71 is dipped into the bath of plugging material 72. Thereby, in embodiments alternating plugged and unplugged channels are formed in the end face 71 forming a checkerboard pattern that is opposite to the checkerboard pattern on the end face 75 that was plugged during extrusion. By way of example, if a channel is plugged on end face 71, that channel will not be plugged on end face 75, and if a channel is plugged on end face 75, that channel will not be plugged on end face 71.

Figure 7C:
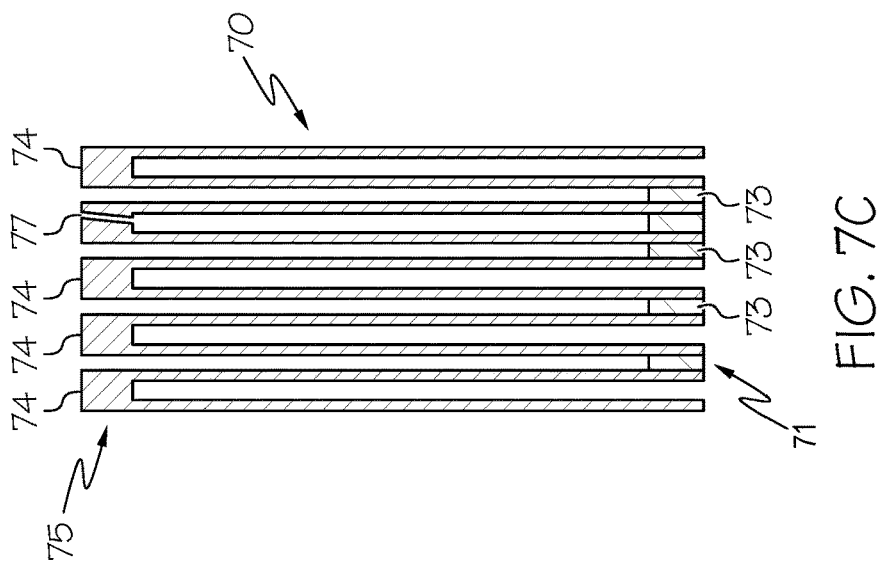
FIGS. 7A-7C schematically illustrate an apparatus for plugging channels of a honeycomb filter according to embodiments described herein.
Figure 7B:
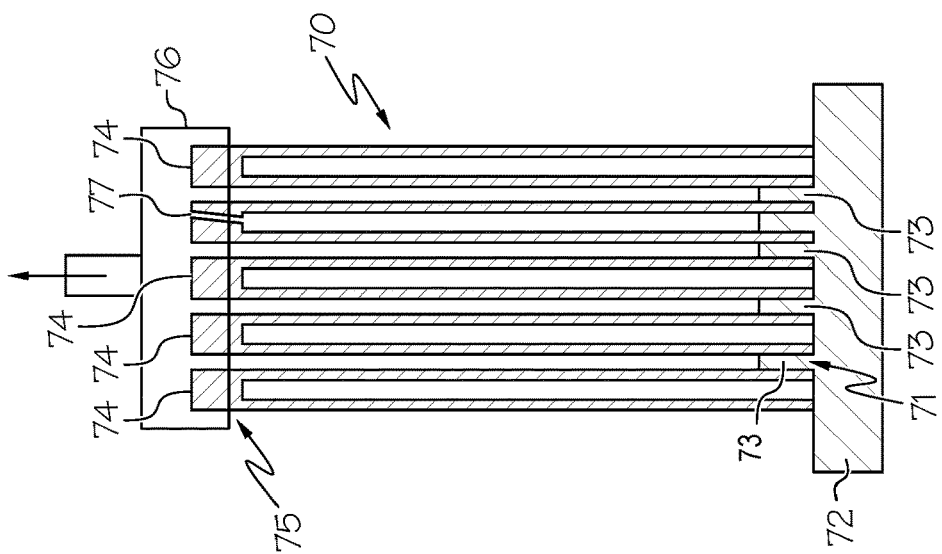
Figure 7A:
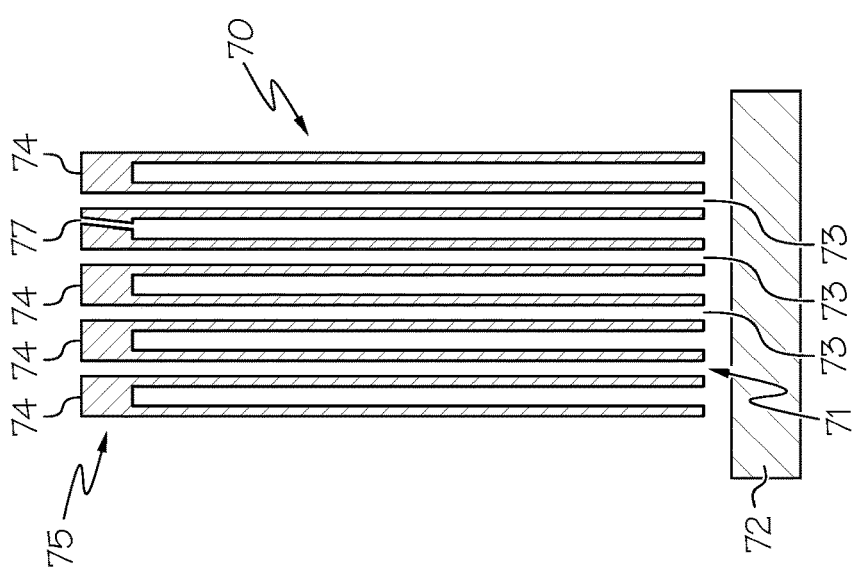

With reference to FIG. 7B, to facilitate the drawing of the plugging material 72 into the channels, in embodiments, a vacuum device 76 may be placed on the end face 75, and a vacuum may provided to the channels that were not plugged during extrusion. No vacuum will be formed in the channels that were plugged during extrusion, thus the plugging material is not drawn into those channels. The plugging material 72 may be drawn into the channels at a depth equal to the length of the plugging in the end face 75 of the honeycomb filter. Accordingly, in embodiments, the depth that the plugging material is drawn into the channels is from greater than or equal to about 1 mm to less than or equal to about 20 mm, such as from greater than or equal to about 2 mm to less than or equal to about 18 mm. In other embodiments, the depth that the plugging material is drawn into the channels is from greater than or equal to about 5 mm to less than or equal to about 15 mm, such as from greater than or equal to about 7 mm to less than or equal to about 10 mm. In some embodiments, the depth that the plugging material is drawn into the channels is from greater than or equal to about 2 times the diameter of a cell to less than or equal to about 6 times the diameter of a cell, such as from greater than or equal to about 3 times the diameter of a cell to less than or equal to about 5 times the diameter of a cell.

In addition to plugging channels that were not plugged by deformation during extrusion, this process of drawing a plugging material 72 into the channels may be used to plug channels that were not completely plugged during extrusion. For example, in FIG. 7A and FIG. 7B, a channel 77 comprises a leak or a side plug in the end face that was plugged by deformation during extrusion. In embodiments, a vacuum will be created in channel 77 as a result of the lead and plugging material will be drawn into the channel at the end face that was not plugged during extrusion, thereby completely plugging at least one end of channel 77.

In embodiments, after the end face 72 has been plugged with plugging material, the honeycomb filter may be dried and sintered to form a ceramic honeycomb filter.

The green body can then be heated to be dried and further heated and processed into a fired honeycomb body. The fired honeycomb body can comprise various refractory materials depending on the particular application. For example, the fired honeycomb bodies may comprise a ceramic material such as cordierite, mullite, silicon carbide, aluminum titanate or other materials or combinations thereof.

Figure 8:
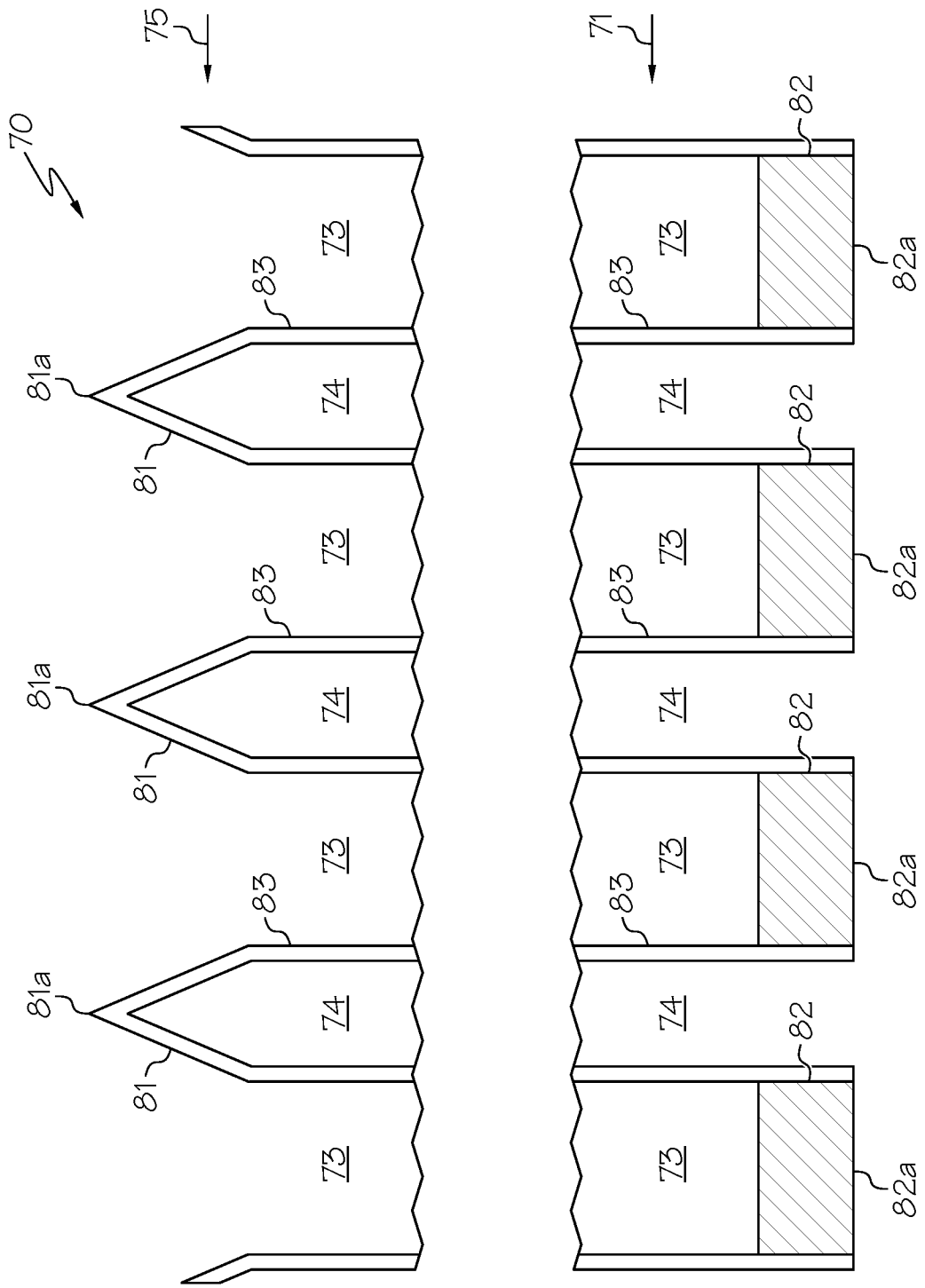
FIG. 8 schematically illustrates a cross section of a honeycomb filter according to embodiments described herein.

In embodiments, and with reference to FIG. 8, honeycomb filter 70 has a first end face 75 and an a second end face 71 and a multiplicity of cells or channels 73 and 74 extending from the first end face 75 to the second end face 71, the cells having porous cell walls 83 and forming a grid pattern at the first end face 75 and at the second end face 71. Channels 74 are plugged at the first end face 75 and channels 73 are plugged at the second end face 71 along a portion of their lengths. Channels 73 are not plugged at the first end face 75 and channels 74 are not plugged at the second end face 71. Thus, alternating channels at the first end face 75 and at the second end face 71 are plugged creating a checkerboard pattern of plugged and unplugged channels at each end face.

Honeycomb filters manufactured according to embodiments described hereinabove may comprise a first end face 75 where alternating channels 74 of the honeycomb filter 70 are plugged by deforming the channels of the web structure, such as by converging cell walls of the web structure. However, alternating channels 73 of a second end face 71 of the honeycomb filter 70 is plugged with a plugging material 72, such as by the methods described hereinabove. Accordingly, in embodiments, the honeycomb filter 70 will comprise a first end face 75 having alternating channels 74 that are plugged by a composition identical to the composition of the channels, and the honeycomb filter 70 will have a second end face 71 where alternating channels 73 are plugged with a plugging material 72 having a composition that may be different from the composition of the channels. Honeycomb filters 70 of embodiments will comprise a first end face 75 where the plugs of alternating channels 74 are formed from the walls of the channels. These plugs may be formed by converging alternating cell walls through the deformation described hereinabove. Accordingly, there is no compositional transition between the plugs and the channels or cell walls in the first end face 75 of the honeycomb filter 70. The second end face 71 of honeycomb filter 70 according to embodiments will be plugged with a plugging material 72 that may, in embodiments, have a composition that is different from the composition of the channels or cell walls and is inserted into alternating channels 73. The plugs in the alternating channels 73 of the second end face 71 comprise a compositional transition between the plugging material 72 and the cell walls. As used herein a "compositional transition" describes an interface within the honeycomb filter between materials having differing compositions. In embodiments, the compositional transition may be well defined, having little to no intermingling of the differing compositions so that on one side of the compositional transition the honeycomb filter substantially has a first composition and on the other side of the compositional transition the composition substantially has a second composition. In other embodiments, the compositional transition may be more gradual and may comprise a portion of the honeycomb filter that comprises an intermingling of a first composition and a second composition. In such an embodiment, the concentration of the first composition may gradually decrease and the concentration of the second composition may gradually increase across the compositional transition in a first direction and the concentration of the second composition may gradually decrease and the concentration of the first composition may gradually increase across the compositional transition in a second direction, which is opposite to the first direction. It should be understood that in embodiments, the intermingling of the first composition and the second composition may be chemical intermingling on a molecular level, or the intermingling of the first composition and the second composition may be physical intermingling where the second composition fills cracks or pores in a structure comprised of the first composition.

With reference now to FIG. 8, honeycomb filters 70 according to embodiments comprise a first end face 75 where the plugs 81 of alternating channels 74 are formed by deforming the cell walls of channels, and the plugs 81 thus formed have a non-planar geometry at an outer end of the plug 81*a*, such as the tapered geometry of embodiments shown in FIG. 8. In embodiments, the non-planar geometry may take virtually any shape such as, for example, V-shaped, arrow-head, conical, frustoconical, right-triangular, concave V, convex arcing, tear drop, pear-shaped, The honeycomb filters 70 also comprise a second end face 71 where alternating channels 73 plugs 82 formed by inserting plugging material into the alternating channels 73, and the plugs thus formed have a planar geometry (e.g., the flat geometry of the embodiments shown in FIG. 8) at an outer end of the plug 82*a*. Accordingly, in embodiments, the plugs 81 of alternating channels 74 of the first end face 75 of a honeycomb filter 70 have a different geometry (e.g., the tapered geometry shown in FIG. 8) than the plugs 82 in alternating channels 73 of the second end face 71 of a honeycomb filter 70.

In embodiments, the plugs 81 extend into the honeycomb filter at a depth of from greater than or equal to about 1 mm to less than or equal to about 15 mm from a corresponding end face of the honeycomb filter, such as from greater than or equal to about 2 mm to less than or equal to about 10 mm from a corresponding end face of the honeycomb filter. In other embodiments, the plugs 81 extend into the honeycomb filter at a depth of from greater than or equal to about 3 mm to less than or equal to about 9 mm from a corresponding end face of the honeycomb filter, such as from greater than or equal to about 4 mm to less than or equal to about 8 mm from a corresponding end face of the honeycomb filter.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for forming a plugged honeycomb article, the method comprising:
    feeding a ceramic precursor material through an extrusion die, the extrusion die comprising a plurality of pins, a plurality of cavities bounded by adjacent pins, and alternating end-faces of the plurality of pins comprise extensions extending from an outlet of the extrusion die in an extrusion direction beyond end-faces of pins that do not comprise extensions, wherein the ceramic precursor material is extruded through the plurality of cavities;
    extruding the ceramic precursor material through the extrusion die to form a web structure comprising a plurality of cell walls and channels bounded by adjacent cell walls;
    supporting the web structure that has been extruded through the extrusion die; and
    providing movement between the extrusion die and the web structure in at least one direction substantially orthogonal to the extrusion direction while the extensions are positioned in at least a portion of the channels, wherein the movement in the orthogonal direction laterally deforms the cell walls so that alternating channels are plugged.

2. The method of claim 1, wherein the ceramic precursor material is fed through the extrusion die at a rate from greater than or equal to about 5 mm/s to less than or equal to about 255 mm/s.

3. The method of claim 1, wherein providing movement between the extrusion die and the web structure comprises providing periodic movement between the extrusion die and the web structure as the ceramic precursor material is extruded through the extrusion die such that alternating channels are periodically plugged along a length of the alternating channels.

4. The method of claim 3, wherein an interval comprising no movement between the extrusion die and the web structure is present between each periodic movement.

5. The method of claim 4, wherein the interval creates a plugged region having a length from greater than or equal to about 2 mm to less than or equal to about 30 mm.

6. The method of claim 1, wherein providing movement between the extrusion die and the web structure comprises providing an offset circular motion at a speed of from greater than or equal to about 30 rpm to less than or equal to about 1000 rpm.

7. The method of claim 1, wherein providing movement between the extrusion die and the web structure comprises holding the web structure stationary and moving the extrusion die laterally relative to the web structure.

8. The method of claim 1, wherein providing movement between the extrusion die and the web structure comprises holding the extrusion die stationary and moving the web structure laterally relative to the extrusion die.

9. The method of claim 1, further comprising:
    cutting the web structure at an axial location where the cell walls have been plugged and at an axial location where the cell walls have not been plugged, thereby forming a honeycomb article comprising alternating plugged and unplugged channels on a first axial end surface and unplugged channels on a second axial end surface.

10. The method of claim 9, further comprising:
    drying the web structure after the movement has been provided;
    dipping the second axial end surface into a plugging material;
    drawing the plugging material into a portion of channels that are unplugged at the first axial end surface, thereby plugging alternating channels on the second axial end surface of the honeycomb article;
    drying the honeycomb article; and
    sintering the honeycomb article to form a ceramic honeycomb article.

11. The method of claim 10, wherein the plugging material is drawn into a portion of the channels that are unplugged at the first axial end surface by creating a vacuum across the channels that are unplugged at the first axial end surface.

12. The method of claim 10, wherein the plugging material is drawn into the portion of channels at a depth of from greater than or equal to about 1 mm to less than or equal to about 20 mm.

13. The method of claim 1, wherein an open frontal area of the plugged honeycomb article is from greater than or equal to about 35% to less than or equal to about 95%.

14. The method of claim 1, wherein a pressure drop across the plugged honeycomb article is from greater than or equal to about 25 KPa to less than or equal to about 40 KPa.

15. An apparatus for forming a plugged honeycomb article, the apparatus comprising:
    an extrusion die, the extrusion die comprising a plurality of pins and a plurality cavities between the plurality of pins, wherein alternating pins of the plurality of pins comprise extensions extending from an outlet of the extrusion die in an extrusion direction, and wherein the alternating pins comprising extensions extend beyond pins that do not comprise extensions in the extrusion direction;

a supporting structure that supports an extrusion of ceramic precursor material exiting the outlet of the extrusion die; and at least one of the extrusion die and the supporting structure are mechanically coupled to an eccentric system providing movement between the extrusion die and the supporting structure in at least one direction substantially orthogonal to the extrusion direction of the extrusion die.

16. The apparatus of claim 15, wherein the eccentric system moves the supporting structure relative to the extrusion die.

17. The apparatus of claim 15, wherein the eccentric system moves the extrusion die relative to the supporting structure.

18. The apparatus of claim 15, wherein the supporting structure is selected from the group consisting of an air bearing, a set of rollers, and a set of moving belts.

19. The apparatus of claim 15, wherein the alternating pins comprising extensions extend beyond the pins that do not comprise extensions in the extrusion direction by from greater than or equal to about 2 mm to less than or equal about 10 mm.

* * * * *